United States Patent Office 3,014,890
Patented Dec. 26, 1961

3,014,890
ALKENYLARYL GLYCIDYL ETHERS AND POLYMERS THEREOF
Theodore F. Bradley, Orinda, and Richard D. Harline, Walnut Creek, Calif., assignors to Shell Oil Company, a corporation of Delaware
No Drawing. Filed Apr. 12, 1954, Ser. No. 422,680
22 Claims. (Cl. 260—47)

This invention relates to a new class of ether compounds and to valuable polymers thereof. More particularly, the invention pertains to 2-alkenylaryl glycidyl ethers and their polymers.

A principal object of the present invention is to provide new epoxide resins from monomeric ether compounds. Another object is to obtain new epoxide resins by polymerization of monomeric ether compounds. A further object is to provide new monomeric ether compounds from which the epoxide resins are obtained by polymerization. Other objects will be apparent from the following description of the invention.

The monomeric ethers from which the new epoxide resins are obtained by polymerization are compounds of the formula $(R)_mAr(O-E)_n$ wherein R is a hydrocarbon radical containing an olefinic linkage, $m$ and $n$ are each integers of 1 to 3, Ar is an aromatic nucleus having a valence of $m+n$, O is an ether oxygen atom, and E is a hydrocarbon radical containing an epoxide group therein with the epoxy oxygen atom linked to other than the carbon atom to which said ether oxygen atom is directly attached. The epoxy oxygen atom is one of the three members in the cyclic oxirane group. A typical compound of the class is 2-allylphenyl glycidyl ether.

The compounds of the invention are prepared by reacting a phenol containing an olefinic linkage in a hydrocarbon substituent group thereon with a halo-epoxide, especially a chloro- or bromo-epoxide such as epichlorohydrin or epibromohydrin, with the aid of a base such as sodium hydroxide. In effecting the reaction, it is desirable to use a stoichiometric excess of the halo-epoxide. The monomeric ethers are preferably obtained by adding about an equivalent amount of sodium hydroxide in aqueous solution to a mixture of the phenol and about 4 to 10 equivalents of the halo-epoxide, the addition being conducted while distilling off water from the reaction mixture, preferably as an azeotrope with the halo-epoxide. The equivalency has reference to the phenolic hydroxyl groups of the phenol. The temperature used in effecting the reaction is usually from about 60° C. to 150° C. although it is convenient to employ the refluxing or distilling temperature of the reaction mixture which is governed largely by the halo-epoxide. Upon completion of the addition of base to the reaction mixture, the reaction mixture can be heated for an additional short time to insure completion of the reaction. The by-product salt may be removed from the reaction mixture by filtration. The unreacted halo-epoxide is distilled from the crude monomeric ether, and the ether is purified by distillation, preferably in vacuo.

The monomeric ethers are obtained from various phenols that have an olefinic linkage in a hydrocarbon substituent linked to a nuclear carbon atom. The phenols contain 1 to 3 phenolic hydroxyl groups and 1 to 3 hydrocarbon substituents having an olefinic linkage therein. The phenols are either mononuclear or polynuclear with or without fused ring systems. Typical phenols from which the ethers are prepared include: 2-vinylphenol, 3-vinylphenol, 4-vinylphenol, 3,5-dibromo-4-vinylphenol, 2,3,5-tribromo-4-vinylphenol, 2-propenylphenol, 3-propenylphenol, 4-propenylphenol, 2-isopropenylphenol, 4-isopropenylphenol, 2-butenylphenol, 2-(1-ethylpropenyl)-phenol, 2-(3-methylpropenyl)phenol, 2-heptenylphenol, 2-hydroxy-4-vinylphenol, 2-methoxy-4-vinylphenol, 2-hydroxy-3-propenylphenol, 2-hydroxy-4-propenylphenol, 2-allylphenol, 3-allylphenol, 4-allylphenol, 2-allyl-6-methylphenol, 2-allyl-3-methylphenol, 2-allyl-4-methylphenol, 2,6-diallylphenol, 2-allyl-4,6-dimethylphenol, 2,6-diallyl-3-methylphenol, 2-allyl-4-methyl-6-propylphenol, 2-allyl-3,5,6-trimethylphenol, 2-allyl-6-chlorophenol, 2-allyl-4-bromophenol, 2-allyl-6-hydroxyphenol, 4-allyl-2-hydroxyphenol, 2-allyl-5-hydroxyphenol, 2-allyl-6-methoxyphenol, 2-allyl-4-methoxyphenol, 2,5-diallyl-6-hydroxyphenol, 2,6-diallyl-5-hydroxyphenol, 2,4,6-triallylphenol, 2-allyl-4-acetoxyphenol, 2,4,6-triallyl-3-allyloxyphenol, 4-acetyl-2-allyl-6-methoxyphenol, 2-allyl-6-carboethoxyphenol, 2-allyl-1-naphthol, 1-allyl-2-naphthol, 2-allyl-4-phenylphenol, 7-allyl-8-hydroxyquinoline, 2-allyl-5-hydroxy-4-nitrophenyl, 2-methallylphenol, 4-chloro-2-methallylphenol, 2,6-dimethallylphenol, 2-crotylphenol, 4-crotyl-2,6-dichlorophenol, 2-allyl-4-phenylazophenol, 1-(α-phenylallyl)-3-carbomethoxy-2-naphthol, 2-carbomethoxy-6-methyl-4-(γ-phenylallyl)phenol, 2-(2-cyclohexenyl)phenol and the like. The phenols can have the olefinic linkage in any position of the substituent on the phenol which preferably contains 2 to 10 carbon atoms and is linked in all cases by carbon-to-carbon bonding to the aromatic nucleus. However, it is desirable for marked ease of preparing the epoxy resins from the resulting ethers that the ethers be obtained from an alkenylphenol with the second carbon atom of the alkenyl group having a double-bonded olefinic linkage thereon as is the case with such compounds as 2-vinylphenol, 3-propenylphenol, 2-allylphenol, and 2,6-dimethallylphenol. The allylic phenols constitute a special sub-class of desirable reactants for preparation of ethers. The allylic phenols have an olefinic double-bonded linkage between the second and third (the beta and gamma) carbon atoms of the substituent group which preferably contains 3 to 10 carbon atoms. When prepared by the easily effected Claisen rearrangement, these allylic phenols have the allylic substituent group or groups on the 2- or 2- and 6-positions of the phenol with respect to the phenolic hydroxyl group or groups. The other phenol reactants used in preparing the ethers are obtainable by known, though generally more complex, methods of synthesis. See, for example, volume VI of Beilstein's Handbuch der Organischen Chemie for reference to publications on the various methods of synthesis of the phenolic reactants.

The other organic reactant is a halo-epoxide, which compound contains an epoxide or oxirane group as well as a halogen atom which is preferably a chlorine or bromine atom. Because of commercial availability, it is desirable to prepare the monomeric ethers from epichlorohydrin, the products in this case being glycidyl ethers. Representative other halo-epoxides for use in preparing the ethers include: 1-chloro-2,3-epoxybutane, 1-chloro-3,4-epoxybutane, 2-chloro,3,4-epoxybutane, 1-chloro-2-methyl-2,3-epoxypropane, 1-bromo-bromo - 2,3-epoxypentane, 2-chloromethyl-1,2-epoxybutane, 1-bromo-4-methyl-3,4-epoxypentane, 1-bromo-4-ethyl - 2,3 - epoxypentane, 4-chloro-2-methyl-2,3-epoxypentane, 1 - chloro - 2,3-epoxyoctane, 1-chloro-2-methyl-2,3-epoxyoctane, 1-chloro-2,3-epoxyoctane, and the like. It is desirable, though not necessary, that the halo-epoxide contain 3 to 10 carbon atoms.

At ordinary temperatures, the monomeric ethers are usually either somewhat oily, water-white or light colored liquids, or crystalline solids in the case of higher members. A large variety of particular compounds are included in the scope of the monomeric ethers of the invention. For example, the ethers include the compounds wherein the hydrogen atoms of the phenolic groups of any of the aforementioned phenolic reactants are replaced by the radical linked to the halogen atom of any of the aforementioned halo-epoxides. The invention includes among others such typical compounds as 2-allylphenylglycidyl ether, 2,6-diallylphenyl glycidyl ether, 2-vinylphenyl glycidyl ether, 3,5-dibromo-4-vinylphenyl 3,4-epoxybutyl ether, 2-(1-ethylpropenyl)phenyl 2,3-epoxyoctyl ether, 1,2-bis(glycidyloxy)-4-vinylbenzene, 2-methoxy-4-vinylphenyl glycidyl ether, 2-allyl-3,5,6-trimethylphenyl 2-methyl-2,3-epoxypentan-4-yl, 2,4,6-triallyl-3-allyloxyphenyl glycidyl ether, 2-allyl-1-naphthyl glycidyl ether, 2-crotylphenyl 2-methyl-2,3-epoxypropyl ether, 2-(2-cyclohexenyl)phenyl glycidyl ether, 2,4,6-triallylphenyl glycidyl ether, 2-allyl-4-acetoxyphenyl glycidyl ether, 2-allylphenyl 1,2-epoxy-1-phenylbut-3-yl ether, 2-allyl-4-acetoxyphenyl glycidyl ether, 1,3,5-tris(glycidyloxy)-2-allylbenzene, 2-allyl-6-carboethoxyphenyl glycidyl ether, 2-allyl-4-phenylazophenyl glycidyl ether and the like.

Having reference again to the formula $R_m(Ar)(O-E)_n$ in the third paragraph of this description, preferred ethers are those in which R is an alkenyl radical of up to 10 carbon atoms having an olefinic double bond on the second carbon atom thereof (e.g., as with vinyl or allyl radicals), particularly with R being such an alkenyl radical having the second and third carbon atoms thereof linked by the double-bonded olefinic linkage as in allylic radicals. It is also preferred that Ar be a phenyl radical. Likewise it is preferred that $m$ and $n$ each be the integer one, that the olefinic radical and the epoxyether radical be linked to adjacent or vicinal carbon atoms of the aromatic nucleus Ar, and the E is a 2,3-epoxyalkyl radical of up to 10 carbon atoms.

The monomeric ethers of the invention are useful for producing the new epoxy resins. The ethers are also useful for producing alkyd resins by reaction therewith of polycarboxylic, particularly dicarboxylic, acids or acid anhydrides. Drying resins are obtained by polymerizing the ethers through the epoxy groups as with a Friedel-Crafts metal halide catalyst. For example, polymerization of a glycidyl ether gives an olefin-containing aryl polyether of polyglycerol which has air-drying properties useful for protective films.

The new epoxy resins of the invention are obtained by polymerizing the ethers so that coupling occurs through the olefinic bonds therein. This may and will be termed addition polymerization herein. The addition polymerization is effected by heating the monomeric ether at about 50° C. to 300° C. in the presence of a polymerization catalyst containing two oxygen atoms joined by an oxygen-to-oxygen bond. If the ether is polymerized with molecular oxygen, the polymerization may be easily effected by passing dispersed air into and through the heated liquid ether. It is more generally desired to use a peroxy catalyst such as hydrogen peroxide, benzoyl peroxide, acetyl peroxide, benzoyl acetyl peroxide, tertiary butyl perbenzoate, lauroyl peroxide, dibutyryl peroxide, perbenzoic acid, cumene hydroperoxide, succinyl peroxide, etc. In order that the resulting polymer will contain as many unchanged epoxy groups as possible, it is essential that the ether be polymerized in the presence of an oxygen-yielding peroxy catalyst that is non-acid engendering because liberated acid may react with epoxy groups. Reference is made to preferred use of such catalysts as tertiary alkyl hydroperoxides such as tertiary butyl hydroperoxide, di(tertiary alkyl)peroxides such as di(tertiary butyl)peroxide and the like. About 0.1 to 10% by weight of the peroxides are used in effecting polymerization therewith.

The resulting polymers are usually fusible solids at ordinary temperature. In order that polymers of altered properties will be obtained, the ethers are addition copolymerized with one or more other compounds containing a vinylidene group such as styrene, acrylonitrile, vinyl chloride, vinyl acetate, methyl methacrylate, diallyl phthalate and the like. The amount of copolymerizable compound in admixture with the ether can be varied over wide limits, say from 1% to 99% by weight, depending upon the properties and epoxy content desired in the resulting copolymer. The copolymerization is effected in the same way as the homopolymerization, i.e., by heating the liquid mixture of compounds at about 50° C. to 300° C. in the presence of the addition polymerization catalyst.

In preparing the homopolymers and copolymers of the invention, the polymerization is usually not continued to complete conversion of the monomer to polymer, although this may be done if desired. Ordinarily, the polymerization is arrested by cooling after there has been a substantial conversion of say, more than 10% conversion of monomer to polymer. By adding a non-solvent for the polymer to the reaction mixture such as hexane, the polymer is precipitated and may be recovered by filtration.

The homopolymers and copolymers of the invention, besides usually being fusible solids at ordinary temperature, are soluble in various organic liquids such as aromatic hydrocarbons for polymers of lower molecular weight and ketones for both lower and higher molecular weight polymers.

The addition polymers or epoxy resins of the invention have only carbon atoms in the polymer chain. The homopolymers contain a plurality of epoxy groups. Copolymers of the ethers with other polymerizable vinylidene compounds ordinarily contain at least one epoxy group in an average macromolecule thereof.

Owing to the presence of the epoxy groups in the addition polymers, they are very useful substances. They may be mixed or blended with halogen-containing polymers such as polyvinyl or polyvinylidene chloride so as to both plasticize and stabilize the polymers. They may be mixed with amines or polycarboxylic acids and cured to hard tough products upon heating. In this last use, they are of value in variety of applications such as adhesives, laminating, surface coating and molding. Drying esters may be prepared by reacting the polymers with unsaturated drying or semi-drying oil fatty acids, which drying esters are useful as protective coating vehicles.

The invention is illustrated in the following specific examples, but it is to be understood that the invention is not to be construed as limited to details described therein. The parts are by weight.

*Example I*

2-allylphenyl glycidyl ether was prepared by reacting sodium hydroxide with a mixture of 2-allylphenol and a stoichiometric excess of epichlorohydrin. The apparatus employed was a heated reaction vessel equipped with a thermometer, a mechanical stirrer, a dropping device for admitting aqueous caustic, and a vapor take-off to which was fitted a water-cooled condenser with a head thermometer and a condensation collecting and separating chamber provided with a return to convey the lower epichlorohydrin layer to the reaction vessel. The separating chamber also had a draw-off and collector for the upper aqueous layer.

A mixture of 240 parts of 2-allylphenol and 1284 parts epichlorohydrin was heated to reflux and then 72 parts of sodium hydroxide as a 40% aqueous solution was added drop-wise during one hour's time. The caustic was added at such a rate that the head temperature was about 115 to 117° C. while collecting the aqueous layer in the separating chamber and returning the epichlorohydrin layer as reflux. After completing the addition of the caustic, the reaction mixture was heated for another one-half hour under reflux. The reaction mixture was then cooled to room temperature and the formed salt removed by filtration. The salt cake was washed twice with a small amount of toluene and the washings combined with the filtrate. Unreacted epichlorohydrin and toluene were removed from the filtrate by distillation and the desired 2-allylphenyl glycidyl ether was recovered as a distillate boiling at about 100–103° C. under 0.6 mm. Hg pressure.

A 72% yield of the ether was obtained which was a water-white mobile liquid having a refractive index ($n20/D$) of 1.5310, an epoxy value of 0.504 epoxide equivalent per 100 grams (theory: 0.526) and a bromine number of 84–85 (theory: 84.2).

Example II

In similar fashion to that described in Example I, 2,6-diallylphenyl glycidyl ether was prepared by treating a mixture of 87 parts of 2,6-diallylphenol and 462.5 parts of epichlorohydrin with 40 parts of sodium hydroxide as a 40% aqueous solution. There was obtained a 78% yield of the ether which was a colorless liquid boiling at about 126–129° C. at 0.6 mm. Hg. The ether had a refractive index ($n20/D$) of 1.5290 and an epoxy value of 0.433 epoxide equivalent per 100 grams (theory:0.435).

Example III

Homopolymer of 2-allylphenyl glycidyl ether was prepared by adding about 7.3 parts of di-tertiary-butyl peroxide to 190 parts of the monomeric ether and heating the solution at 150° C. for about 24 hours whereupon another 7.3 parts of the peroxide was added and heating continued for about an additional 72 hours. The formed polymer was precipitated by addition of hexane to the reaction mixture at room temperature (about 25° C.). The filtered polymer was washed repeatedly with hexane to remove unpolymerized monomer, then was dissolved in acetone, and the acetone and hexane removed from the polymer by heating to 120° C. at 0.9 mm. Hg pressure. About 30 parts of solid colorless polymer was recovered having an epoxy value of 0.417 epoxide equivalent per 100 grams and a molecular weight of 691. This polymer thus contained about 2.9 epoxy groups per average molecule.

A 60% solution of the polymer in a mixture of 20% butyl alcohol and 80% toluene was prepared. Diethylene triamine in amount of an added 10% based upon the polymer was mixed with the solution. The mixture was spread on a glass panel with a 10 mil doctor blade, and cured by baking for 15 minutes at 105° C. A hard clear film was obtained.

Example IV

To another 38 parts of 2-allylphenyl glycidyl ether, there was added 1.46 parts of di-tertiary-butyl peroxide and the solution was heated at 150° C. for about 23 hours whereupon another 1.46 parts of the peroxide was added. Heating was continued for another 24 hours and again 1.46 parts of the peroxide was added. After an additional 24 hours heating at 150° C., the mixture was cooled to room temperature and the formed polymer precipitated by adding hexane. The polymer was recovered by filtration and washed to remove monomeric ether. Hexane was separated from the polymer by heating up to about 100° C. under a pressure of 0.6 mm. Hg. About 12 parts of clear solid polymer was obtained that had an epoxy value of 0.395 epoxide equivalent per 100 grams and a molecular weight of 819 so the polymer contained about 3.3 epoxy groups per average molecule.

A 50% solution of the polymer in a mixture of 20 parts of sec-butyl alcohol and 80 parts of toluene was prepared. To the solution was added 6% of diethylene triamine based upon the polymer. The mixture was spread on a glass panel with a doctor blade. The resulting film cured and dried hard in 3¼ hours.

Example V

A mixture of 19 parts of 2-allylphenyl glycidyl ether, 10 parts of methyl methacrylate and 1.46 parts of di-tertiary-butyl peroxide was sealed in a glass tube. The tube was heated at 125° C. for 24 hours. Hexane was added to the tube contents to precipitate the formed copolymer. The precipitate was separated by filtration and washed four times with hot hexane after which residual hexane was removed by heating up to 140° C. at 0.6 mm. Hg pressure. The resulting 13 parts of solid copolymer had an epoxy value of 0.14 epoxide equivalent per 100 grams and a molecular weight of 1450.

A 50% solution of the copolymer in toluene was prepared and 21% of ethylene diamine added thereto along with a very small amount of butyl alcohol to clarify the solution. The solution was spread as a film on a glass panel with a 6 mil doctor blade and cured by baking for 10 minutes at 125° C. The resulting cured film was hard and clear.

Example VI

Vinyl acetate was copolymerized with 2-allylphenyl glycidyl ether using several mol ratios of the monomers and di-tertiary-butyl peroxide as polymerization catalyst. The mixtures were heated at 125° C. to effect copolymerization catalyst. The mixtures were heated at 125° C. to effect copolymerization for the periods given in the table below. The resulting copolymers, all of which were fusible solids, were recovered and purified in the same manner as described in Example V. The data follow:

| | | | |
|---|---|---|---|
| Ester/Ether Mol Ratio | 1/1 | 3/1 | 5/1 |
| Added Percent Peroxide | 5.3 | 6.5 | 7.1 |
| Hours of Heating at 125° C | 47 | 24 | 28.5 |
| Percent Yield of Copolymer | 58 | 66 | 86 |
| Copolymer Properties: | | | |
| Epoxide Eq./100 Grams | 0.270 | 0.166 | 0.121 |
| Molecular Weight | 1,097 | 1,661 | 2,010 |

Example VII

A mixture of 11.5 parts of 2,6-diallylphenyl glycidyl ether, 10 parts of methyl methacrylate and 1.46 parts of di-tertiary-butyl peroxide was heated in a sealed glass tube for 24 hours at 125° C. The resulting copolymer was recovered and purified in the same manner as described in Example V. Twelve parts of fusible solid copolymer was obtained having an epoxide value of 0.094 epoxide equivalent per 100 grams, a molecular weight of 2016 and a bromine number of 24.

Upon baking a film obtained by spreading a 50% solution of the copolymer in toluene containing about an added 14% of ethylene diamine, a hard cured film was obtained.

Example VIII

A mixture of 12.9 parts of vinyl acetate and 5.75 parts of 2,6-diallylphenyl glycidyl ether was copolymerized in the presence of 0.746 part of benzoyl peroxide by heating for 80 hours at 65° C. The resulting copolymer was recovered and purified with use of hexane. It was a fusible solid having an epoxy value of 0.122 epoxide equivalent per 100 grams.

We claim as our invention:

1. A compound of the formula $(R)_m Ar(O—E)_n$ wherein R is a hydrocarbon radical containing an olefinic linkage, $m$ and $n$ are each integers of 1 to 3, Ar is an aromatic nucleus having a valence of $m+n$, O is an ether oxygen atom, and E is a hydrocarbon radical containing an epoxide group therein with the epoxy oxygen atom linked to other than the carbon atom to which said ether oxygen atom is directly attached, said epoxide group being a three-membered ring.

2. The compound as defined in claim 1 wherein $m$ and $n$ are each 1.

3. The compound as defined in claim 2 wherein R is an alkenyl radical having an olefinic double bond on the second carbon atom thereof.

4. The compound as defined in claim 3 wherein the second and third carbon atoms are joined by the double-bonded olefinic linkage.

5. The compound as defined in claim 2 wherein E is a 2,3-epoxyalkyl radical of 3 to 10 carbon atoms.

6. The compound as defined in claim 2 wherein Ar is a phenyl radical.

7. The compound as defined in claim 6 wherein R is an alkenyl radical having an olefinic double bond on the second carbon atom thereof, which alkenyl radical is linked to the 2-position of the phenyl radical, and E is a glycidyl radical.

8. 2-allylphenyl glycidyl ether.

9. 2,6-diallylphenyl glycidyl ether.

10. An addition polymer of a compound of the formula $(R)_mAr(O\text{—}E)_n$ wherein R is a hydrocarbon radical containing an olefinic linkage, $m$ and $n$ are each integers of 1 to 3, Ar is an aromatic nucleus having a valence of $m+n$, O is an ether oxygen atom, and E is a hydrocarbon radical containing an epoxide group therein with the epoxy oxygen atom linked to other than the carbon atom to which said ether oxygen atom is directly attached, said epoxide group being a three-membered ring and which polymer contains oxirane rings and has only carbon atoms in the polymer chain thereof.

11. An addition polymer of a compound of the formula R—Ar—O—E wherein R is an alkenyl radical having an olefinic double bond on the second carbon atom thereof, Ar is a phenyl radical, O is an ether oxygen atom, and E is a glycidyl radical, which polymer contains oxirane rings and has only carbon atoms in the polymer chain thereof.

12. An addition homopolymer of 2-allylphenyl glycidyl ether, which homopolymer has only carbon atoms in the polymer chain thereof and contains unchanged epoxy groups therein.

13. An addition copolymer of 1% to 99% by weight of a compound of the formula $(R)_mAr(O\text{—}E)_n$ and another polymerizable vinylidene compound, wherein said formula R is a hydrocarbon radical containing an olefinic linkage, $m$ and $n$ are each integers of 1 to 3, Ar is an aromatic nucleus having a valence of $m + n$, O is an ether oxygen atom, and E is a hydrocarbon radical containing an epoxide group therein with the epoxy oxygen atom linked to other than the carbon atom to which said ether oxygen atom is directly attached, said epoxide group being a three-membered ring and said copolymer containing unchanged epoxy groups and having only carbon atoms in the polymer chain thereof.

14. An addition copolymer of 1% to 99% by weight of styrene and a compound of the formula R—Ar—O—E wherein R is an alkenyl radical having an olefinic double bond on the second carbon atom thereof, Ar is a phenyl radical, O is an ether oxygen atom, and E is a glycidyl radical, which copolymer contains unchanged epoxy rings and has only carbon atoms in the polymer chain thereof.

15. An addition copolymer of 1% to 99% by weight of vinyl acetate and a c o m p o u n d of the formula R—Ar—O—E wherein R is an alkenyl radical having an olefinic double bond on the second carbon atom thereof, Ar is a phenyl radical, O is an ether oxygen atom, and E is a glycidyl radical, which copolymer contains unchanged epoxy rings and has only carbon atoms in the polymer chain thereof.

16. An addition copolymer of 1% to 99% by weight of methyl methacrylate and a compound of the formula R—Ar—O—E wherein R is an alkenyl radical having an olefinic double bond on the second carbon atom thereof, Ar is a phenyl radical, O is an ether oxygen atom, and E is a glycidyl radical, which copolymer contains unchanged epoxy rings and has only carbon atoms in the polymer chain thereof.

17. An addition copolymer of 1% to 99% by weight of 2-allylphenyl glycidyl ether and styrene, which copolymer contains oxirane rings and has a polymer chain composed only of carbon atoms.

18. An addition copolymer of 1% to 99% by weight of 2-allylphenyl glycidyl ether and vinyl acetate, which copolymer contains oxirane rings and has a polymer chain composed only of carbon atoms.

19. An addition copolymer of 1% to 99% by weight of 2-allylphenyl glycidyl ether and methyl methacrylate, which copolymer contains oxirane rings and has a polymer chain composed only of carbon atoms.

20. An epoxyalkyl alkenylaryl ether of the formula

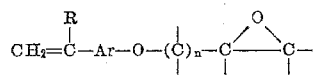

in which R is chosen from the class consisting of hydrogen and methyl, Ar is an arylene radical, $n$ is an integer having a value of at least 1 and no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms.

21. An epoxyalkyl allylaryl ether of the formula

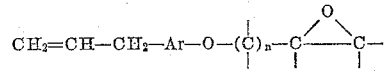

in which Ar is an arylene radical, $n$ is an integer having a value of at least 1 and no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms.

22. A glycidyl allylaryl ether of the formula

References Cited in the file of this patent

UNITED STATES PATENTS

| | | |
|---|---|---|
| 2,314,039 | Evans et al. | Mar. 16, 1943 |
| 2,599,817 | Evans et al. | June 10, 1952 |
| 2,607,754 | Ellingboe et al. | Aug. 19, 1952 |
| 2,710,873 | Gluesenkamp et al. | June 14, 1955 |